US006960746B2

(12) United States Patent
Chen

(10) Patent No.: US 6,960,746 B2
(45) Date of Patent: Nov. 1, 2005

(54) DEVICE FOR INSTANTLY PRE-HEATING DIES

(76) Inventor: Shia Chung Chen, 11 Fl., No. 14, Lane 236, Sec. 1, Jhuangjing Rd., Taoyuan City, Taoyuan County (TW)

( * ) Notice: Subject to any disclaimer, the term of this patent is extended or adjusted under 35 U.S.C. 154(b) by 0 days.

(21) Appl. No.: 10/680,056

(22) Filed: Oct. 6, 2003

(65) Prior Publication Data

US 2005/0087527 A1 Apr. 28, 2005

(51) Int. Cl.[7] .................................................. H05B 6/22
(52) U.S. Cl. ....................................... 219/659; 219/672
(58) Field of Search ................................ 219/600, 601, 219/635, 647, 648, 659, 660, 672, 674, 675, 676; 425/174.8 R, 175

(56) References Cited

U.S. PATENT DOCUMENTS 3,689,728 A * 9/1972 Marini ....................... 219/776
3,731,040 A * 5/1973 Kasper ....................... 219/653
5,338,497 A * 8/1994 Murray et al. .............. 264/486
6,638,048 B2 * 10/2003 Yim ........................... 425/144

* cited by examiner

*Primary Examiner*—Tu Hoang
(74) *Attorney, Agent, or Firm*—Charles E. Baxley

(57) ABSTRACT

A device for instantly pre-heating dies includes an inductive heating coil disposed between two dies. The inductive heating coil includes a spiral shape for generating high frequency induction heat energy. When the dies are separated by a mechanical arm, the inductive heating coil is disposed between die surfaces of the dies, so that high frequency induction heat can act on a die contact part, to allow the die contact part to be pre-heated instantly. As result, not only its pre-heating efficiency is enhanced, electric energy can also be saved and at the same time, the melted plastic material may be ensured to smoothly flow inside the die contact parts.

10 Claims, 6 Drawing Sheets

DEVICE FOR INSTANTLY PRE-HEATING DIES

BACKGROUND OF THE INVENTION

Conventionally, when using mold injection procedures in dies or molds, in order to let the melted plastic material be filled inside the dies and be flowed smoothly, and to prevent the melted plastic material from being cooled too early, a first die and a second die have to be pre-heated to a certain temperature before combining the two dies for injection procedures. This can prevent the melted plastic material from being cooled too prematurely and to allow the melted plastic material to flow smoothly before forming process.

Conventionally, injection-molding uses fixed type heating method inside a first and a second die, high frequency heating techniques may be applied. As shown FIG. 1, which is an invention "Instantly Pre-Heating Mold Structure for Fist and Second Dies" with Publication No. 463718. It uses a first and a second die, in which the first die includes a die contact part, a heating system and a cooling system by its side. The second die includes a die contact part and a filling hole by its side. A first and a second die surfaces are disposed on the heating and cooling system respectively. The first die surface is corresponding to a ceramic or cement epoxy enclosed high frequency induction heating coil system, which is slightly bigger than a die contact part groove, and is disposed at the back of the die contact part. Firstly, let the first die surface be pre-heated, then combine the first and the second die surfaces inside the second die, injection forming is completed speedily and will detach from the dies after being cooled down by a piping system of the cooling system inside the second die surface. The first die surface includes a small area for speedy pre-heating and the second die surface provides a simultaneous cooling effect for injection. Regardless of using either electrical heating or high frequency heating method, the heat must be distributed throughout the whole die in order to let the melted plastic material be flowed smoothly into the die hole for forming. Therefore, the drawback of this conventional type of pre-heating device disposed inside the dies is that, the time needed for pre-heating is long, especially the time needed for pre-heating the die contact part. Secondly, pre-heating temperature often cannot reach an ideal level in the die contact part, causes the melted plastic material unable to flow smoothly inside the dies hole for forming and thus increases the percentage of defective products. Thirdly, even the melted plastic material can flow smoothly inside the dies, the time needed for cooling is often too long and will affect the cooling effect for forming. Therefore, it is a priority to improve the pre-heating and cooling process effectiveness and to shorten the time.

As shown in FIG. 2, illustrated is an outer type dies pre-heating device. It mainly comprises a gas burner head, a fuel pipe, a supportive frame and a regulator valve. The gas burner head is formed on an upper and a lower parts of the dies pre-heating device, concave airing spaces are formed and provided on the upper and the lower parts of the dies pre-heating device. The gas burner head with evenly arranged holes is disposed on the inner ring of the concave airing spaces. The fuel pipe with its one end is screwed on the gas burner head, and another end is connected to a fuel tank to form a circulation body. The supportive frame with its one end is disposed on the middle part of the fuel pipe, and another end is disposed on a forging or injection-forming machine. The regulator valve is connected on an ideal location of the fuel pipe in order to open or close the passage from the fuel tank, and to adjust the fuel volume, so that the temperature can be pre-heated to a desired working temperature from room temperature for the processes of forge-molding and injection-molding of an upper and a lower dies of the forging or injection-molding machine. This conventional type pre-heating device can achieve the pre-heating effectiveness but is only suitable for large-sized forging or injection dies. Besides, it is not suitable for dies of precision parts.

SUMMARY OF THE INVENTION

The present invention is to provide a device for instantly pre-heating the die contact part of dies speedily and properly, while the cooling speed is also enhanced in order to enhance the effectiveness of injection forming and to reduce the defective percentage.

The present invention mainly comprises a first die and a second die, and a high frequency inductive heating coil, which is a coil body in spiral shape with its one end fixed on a mechanical arm for pre-set displacement. A die contact part is disposed on the first and the second dies respectively, and inlet holes are disposed inside the die contact parts. During injection-forming process, after the first and the second dies are separated, the high frequency inductive heating coil is disposed near and between a first and a second die surfaces. So that the high frequency induction heating can act on the die contact parts and achieve pre-heating purpose. Therefore not only the pre-heating efficiency is enhanced, electricity is saved and at the same time, can ensure the melted plastic material to flow smoothly inside the die contact parts.

The present invention will become more fully understood by reference to the following detailed description thereof when read in conjunction with the attached drawings.

DETAILED DESCRIPTION OF THE PREFERRED EMBODIMENT

Figure 2:
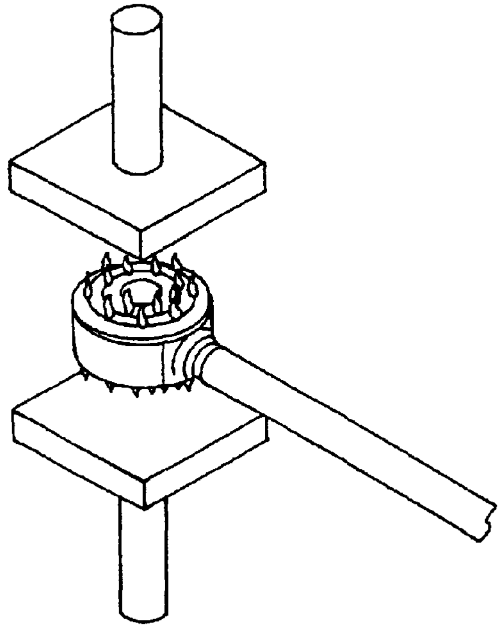
FIG. 2 is a perspective exploded view of a conventional pre-heating device.
Figure 1:
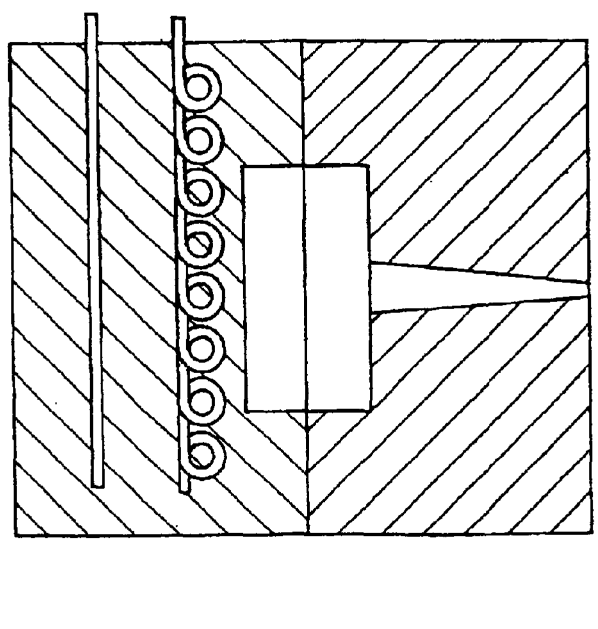
FIG. 1 is a sectional view of a conventional pre-heating device.
Figure 3:
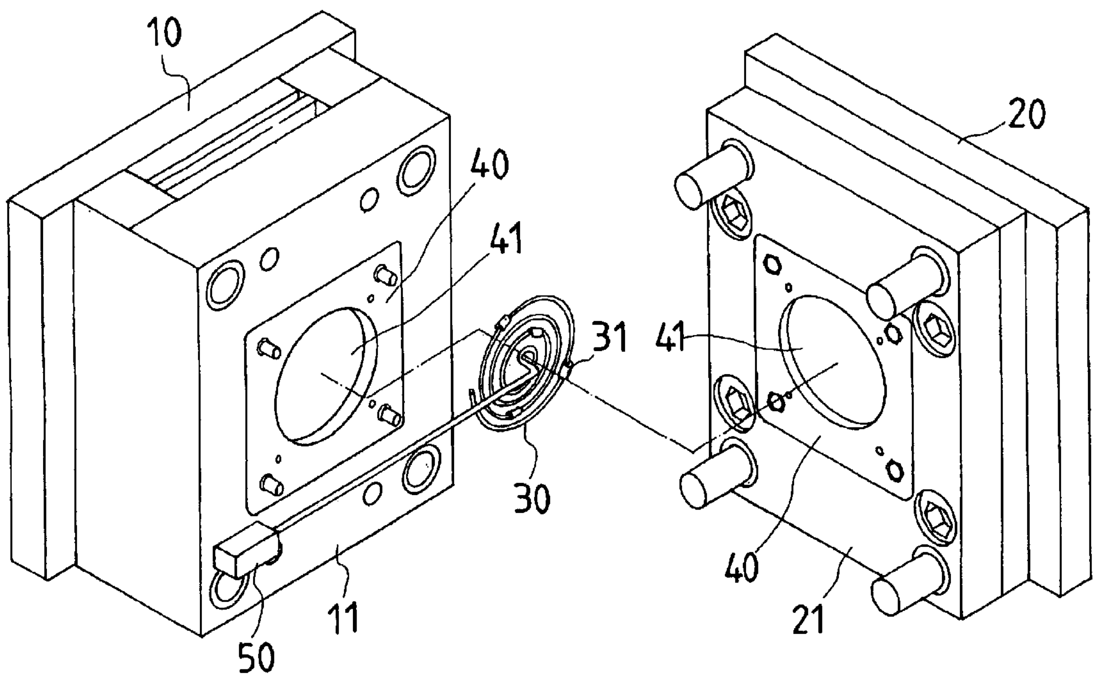
FIG. 3 is a perspective exploded view of the present invention of a device for instantly pre-heating dies.
Figure 4:
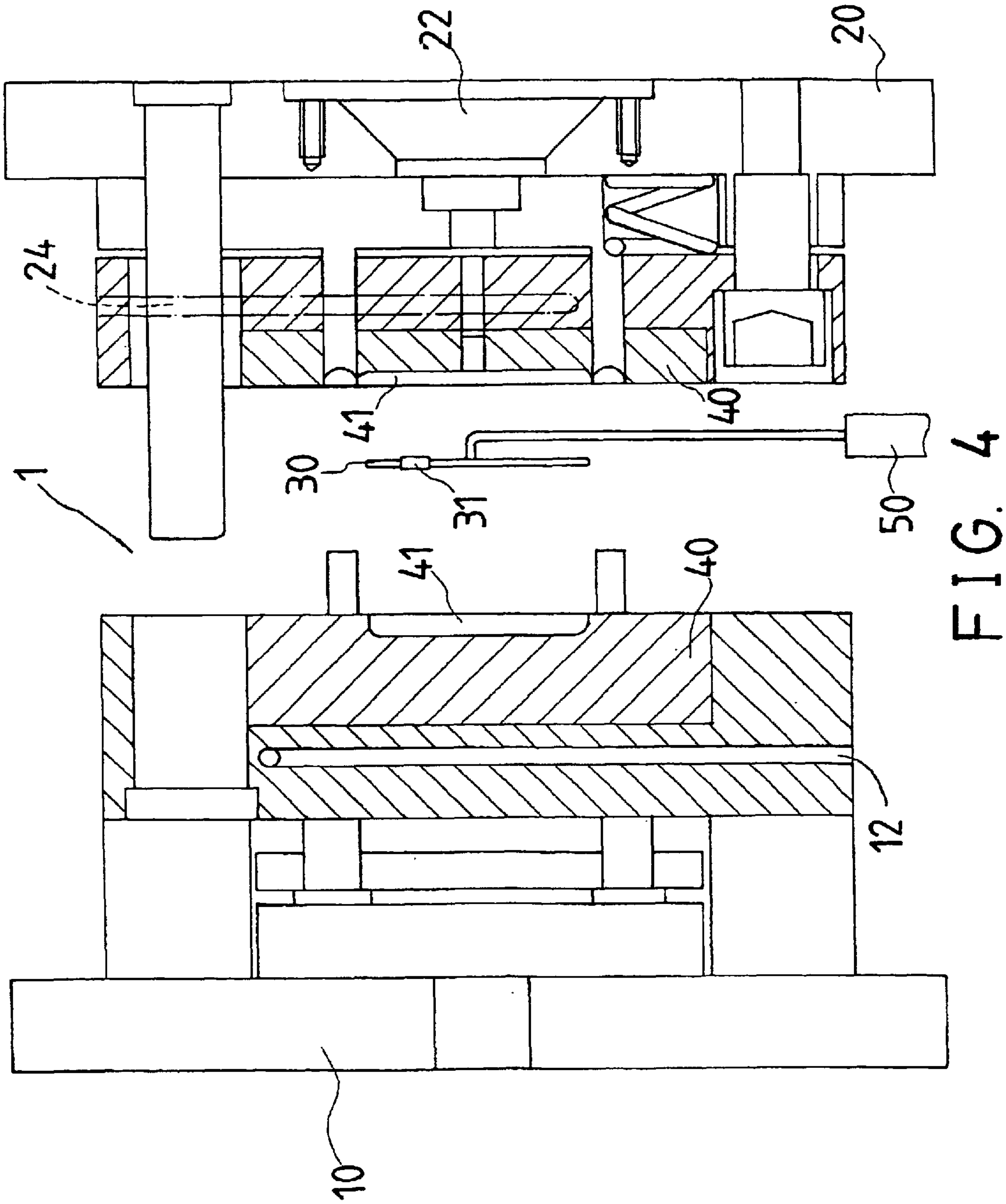
FIG. 4 is a sectional assembly view of the present invention of a device for instantly pre-heating dies.

Referring to FIGS. 3 and 4, the present invention of a device for instantly pre-heating dies mainly comprises a die (1), which is formed by a first die (10) and a second die (20) that are separated from each other, an inductive heating coil (30) is moved and disposed between a die surface (11) and another die surface (21) of the first and the second dies (10, 20) respectively. The inductive heating coil (30) can induct high frequency electromagnetic field to let a die contact part (40) that is disposed on the die surfaces (11) and (12) be pre-heated to a desired temperature, to enhance the injection forming efficiency and to decrease the defective percentage.

As mentioned above, the die contact part (40) is disposed on the die surfaces (11) and (21) of the first and the second dies (10) and (20) respectively, each die contact part (40) includes a die hole (41) and a flow passage (42), cooling passages (12) and (24) are formed on the first and the second dies (10) and (20) respectively near the die contact parts (40), an inlet hole (22) is formed inside the second die (20).

The inductive heating coil (30) is a coil body in spiral shape for transmitting high frequency electromagnetic field and includes one end fixed on a mechanical arm (50). The first and the second dies (10) and (20) are separated. A plurality of ceramic rings (31) are disposed on each circle of the spiral-shape inductive heating coil (30), so as to prevent improper contact with the first and the second dies (10) and (20).

When the first and the second dies (10) and (20) are separated, the inductive heating coil (30) is moved between the die surfaces (11) and (21) by the mechanical arm (50), so that its high frequency electromagnetic field can act directly on the die contact part (40) for allowing the die contact part (40) to be instantly pre-heated and thus to enhance the pre-heating efficiency, and to save electricity and to ensure the melted plastic material to flow smoothly inside the die contact part (40).

Figure 5:
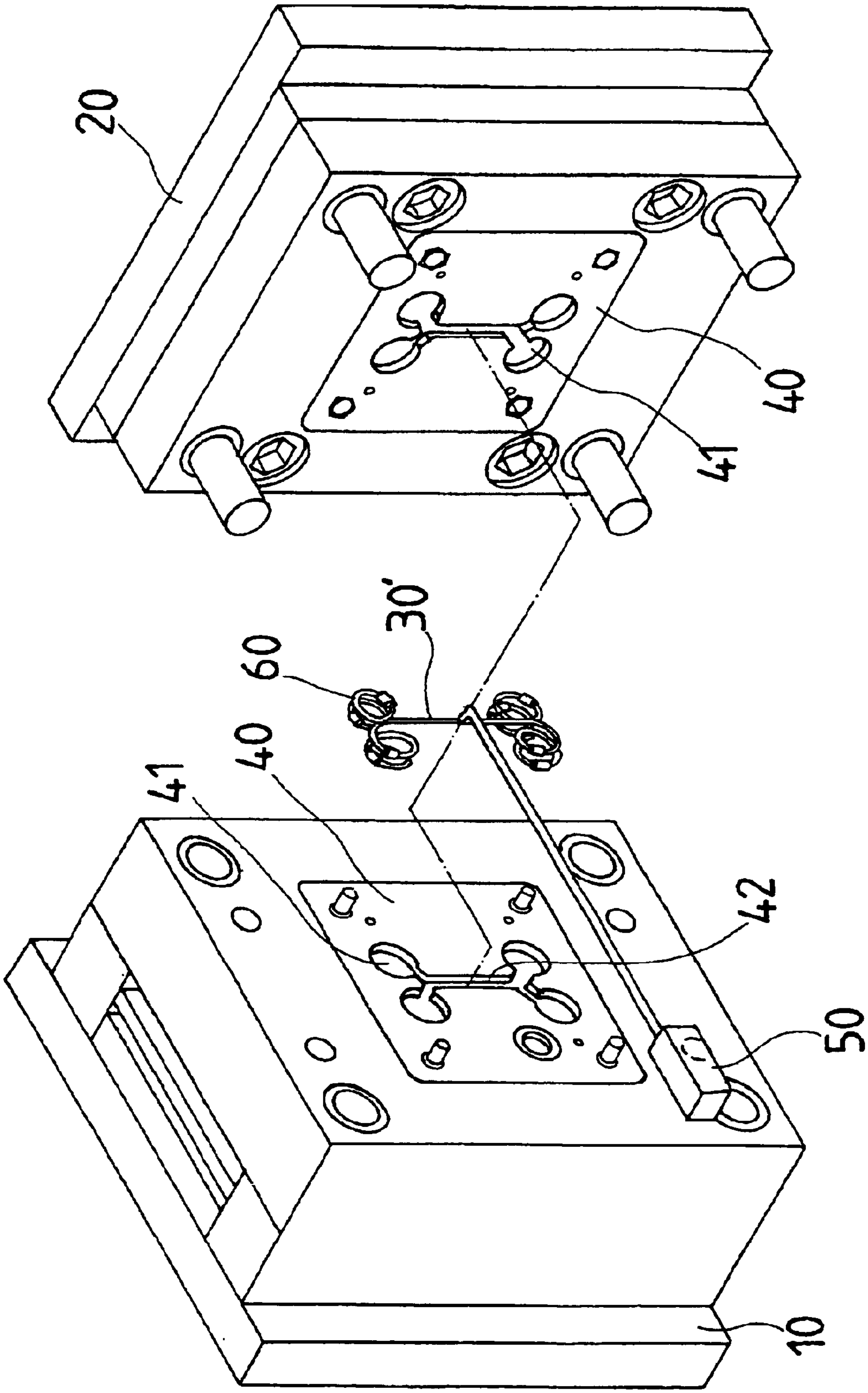
FIG. 5 is a perspective exploded view of a second embodiment of the present invention of a device for instantly pre-heating dies.
Figure 6:
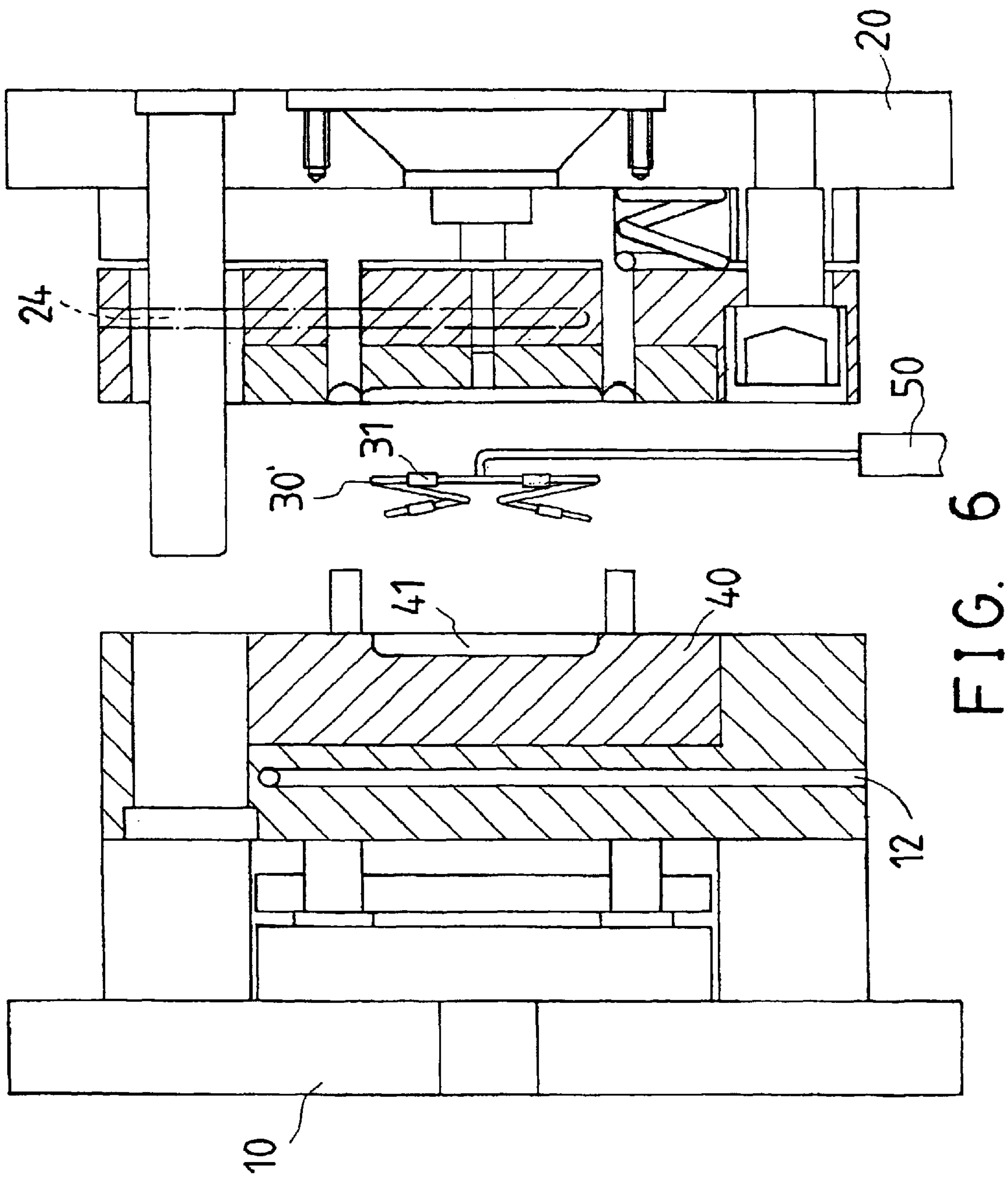
FIG. 6 is a sectional assembly view of the second embodiment of the present invention of a device for instantly pre-heating dies.

The inductive heating coil (30) can be a flat piece or in spiral shape, in corresponding to the surface area and shape of the die contact part (40). As shown in FIGS. 5 and 6, the inductive heating coil (30') is made in corresponding to the shape of the die contact part hole (41) of the die contact part (40). A coil part (60) of the inductive heating coil (30') can be either in serial or parallel arrangement in corresponding to the die contact part hole (41). When the inductive heating coil (30') is moved between the die surfaces (11) and (21) of the first and the second dies (10) and (20) respectively, the coil part (60) can fitly disposed inside the die contact part hole (41), and the inductive heating coil (30') can jog slightly to four directions to make the die contact part hole (41) be pre-heated more efficiently.

Figure 7:
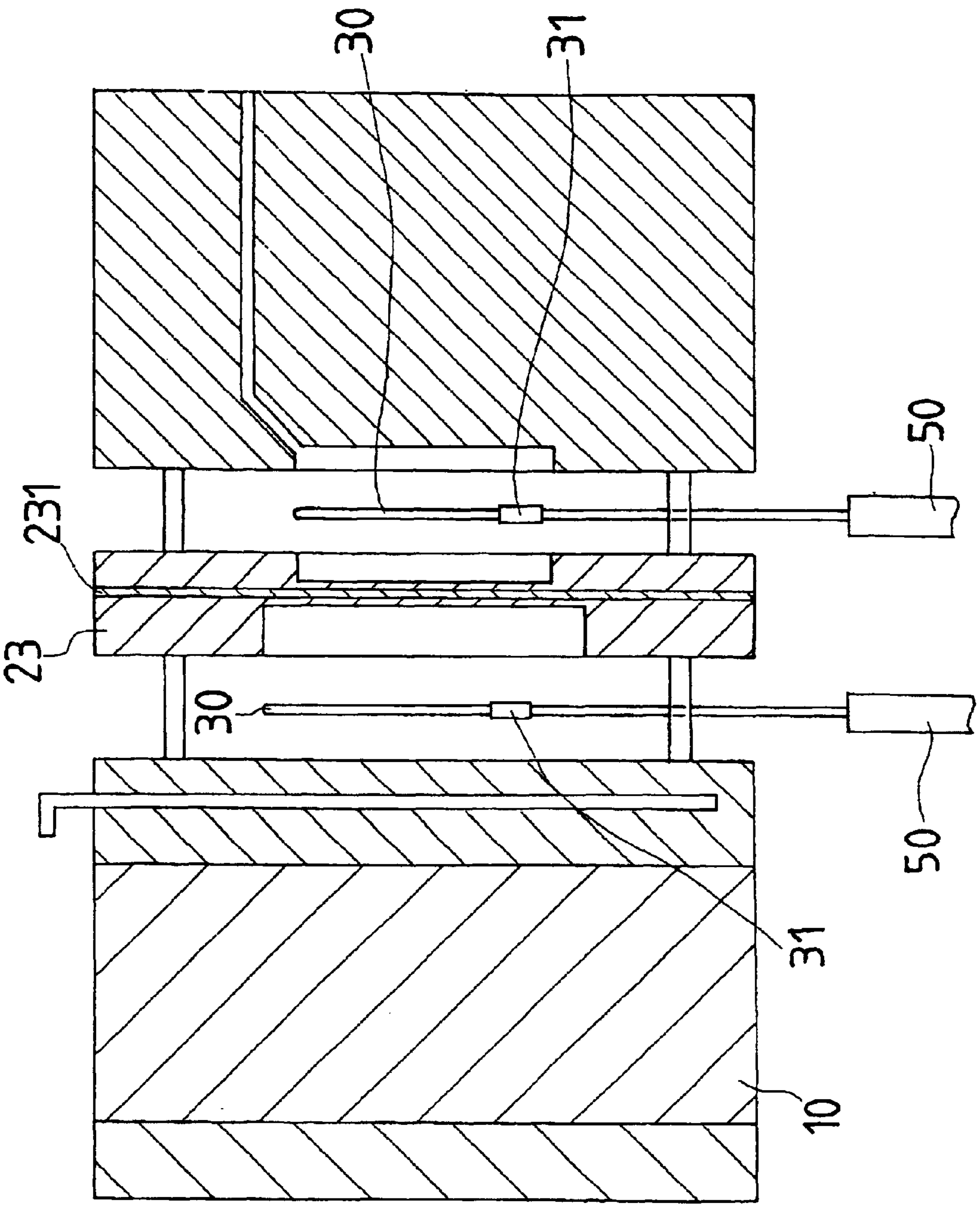
FIG. 7 is a sectional assembly view of a third embodiment of the present invention of a device for instantly pre-heating dies.

As shown in FIG. 7, the present invention can not only be applied in dual-board type die, but also be used in triple-boards die. Besides the first and the second dies (10) and (20), a sub-die (23) is disposed on the second die (20). The inductive heating coil (30) includes two sets and may be moved by the mechanical arms (50) respectively, so that one inductive heating coil (30) is disposed between the first die (10) and the sub-die (23), while another inductive heating coil (30) is disposed between the second die (20) and the sub-die (23). There is something worth mentioned in this embodiment, a magnetic shield layer (231) is disposed inside the sub-die (23), in order to prevent magnetic field inducted by the two inductive heating coils (30) from being attracted toward each other, which may cause the mechanical arms (50) to move improperly.

Accordingly, the present invention can pre-heat speedily in a stable and even distribution manner, and meanwhile can also save electricity, the cooling effectiveness can be enhanced at the same time. Moreover, the present invention emphasizes on the die contact part (40) to make it be pre-heated instantly. As for the first and the second dies (10) and (20), their required pre-heating temperature can be obtained from the injection forming machine, or having a device disposed inside the first and the second dies (10) and (20) to reach a required pre-heating temperature.

Note that the specification relating to the above embodiment should be construed as exemplary rather than as limitative of the present invention, with many variations and modifications being readily attainable by a person of average skill in the art without departing from the spirit or scope thereof as defined by the appended claims and their legal equivalents.

I claim:

1. An instantly pre-heating device comprising first and second dies, a movable inductive heating coil for generating high frequency magnetic fields, said inductive heating coil being moved and jogged independently between said first and said second dies, and disposed near die surfaces of said first and said second dies, so that said die contact parts are pre-heated instantly.

2. An instantly pre-heating device comprising first and second dies, a die contact part disposed on die surfaces of said first and second dies respectively, an inlet hole formed inside said die contact part, an inductive heating coil being separated from said first and second dies, and having a spiral shape to induct high frequency electromagnetic field, its one end being fixed on a mechanical arm for moving in a pre-set route when said first and second dies are separated, said inductive heating coil being moved and disposed between said die surfaces, for generating high frequency magnetic field to act on said die contact part and to have said die contact part be pre-heated instantly.

3. A device for pre-heating dies as claimed in claim 1, said inductive heating coil is either a flat piece or a spiral body, which is corresponding to the shape of said die contact part.

4. A device for pre-heating dies as claimed in claim 3, said inductive heating coil is either in series or parallel arrangement in corresponding to a die contact part hole of said die contact part, when said inductive heating coil is moved between said die surfaces of said first and second dies, said inductive heating coil is placed near said die contact part hole at a position to move and jog said inductive heating coil in four directions.

5. A device for pre-heating dies as claimed in claim 1, said inductive heating coil includes a plurality of ceramic rings disposed on it, in order to prevent said inductive heating coil from improper contacting with said first and second dies.

6. A pre-heating device comprising first and second dies, a sub-die disposed on said second die, a die contact part and an inlet hole formed on die surfaces of said first and said second and said sub-dies, two inductive heating coils being separated from said first, said second and said sub-dies, and including a spiral shape for generating high frequency electromagnetic field, and each being fixed on a mechanical arm respectively, which is moved in a pre-set route, one of said inductive heating coils being moved between said first die and said sub-die after said first die and said sub-die are separated, another said inductive heating coil being moved between said second die and said sub-die, for generating high frequency electromagnetic field to act on said die contact parts.

7. A device for pre-heating dies as claimed in claim 6, said sub-die includes a magnetic shield layer disposed inside in order to prevent two said inductive heating coils from being attracted toward each other.

8. A device for pre-heating dies as claimed in claim 6, said inductive heating coils are either in flat shape or spiral shape, which is corresponding to the shape of said die contact parts.

9. A device for pre-heating dies as claimed in claim 8, said inductive heating coils are either in series or parallel arrangement in corresponding to a die contact part hole of said die contact part, when said inductive heating coils are moved between said die surfaces of said first and said second dies, said inductive heating coils are placed near said die contact part hole at a position to move and jog said inductive heating coil in four directions.

10. A device for pre-heating dies as claimed in claim 1, said inductive heating coils include a plurality of ceramic rings disposed thereon, in order to prevent said inductive heating coil from improper contacting with said first and second dies.

* * * * *